United States Patent
Schedivy (10) Patent No.: US 7,149,078 B2
(45) Date of Patent: Dec. 12, 2006

(54) VIDEO DISPLAY SYSTEM

(75) Inventor: George C. Schedivy, Aquebogue, NY (US)

(73) Assignee: Audiovox Corporation, Haupauge, NY (US)

( * ) Notice: Subject to any disclaimer, the term of this patent is extended or adjusted under 35 U.S.C. 154(b) by 290 days.

(21) Appl. No.: 10/749,443

(22) Filed: Dec. 31, 2003

(65) Prior Publication Data

US 2004/0227861 A1 Nov. 18, 2004

Related U.S. Application Data

(63) Continuation-in-part of application No. 10/438,724, filed on May 15, 2003.

(51) Int. Cl.
*G06F 1/16* (2006.01)
(52) U.S. Cl. .................. 361/681; 361/679
(58) Field of Classification Search ............ 361/679, 361/681, 686
See application file for complete search history.

(56) References Cited

U.S. PATENT DOCUMENTS

| | | | |
|---|---|---|---|
| 4,681,366 A | 7/1987 | Lobanoff | 297/191 |
| 4,756,528 A | 7/1988 | Umashankar | 273/1 |
| 4,843,477 A | 6/1989 | Mizutani et al. | 358/248 |
| 5,255,214 A * | 10/1993 | Ma | 361/680 |
| 5,410,447 A * | 4/1995 | Miyagawa et al. | 361/681 |
| 5,555,466 A | 9/1996 | Scribner et al. | 348/8 |
| 5,949,345 A | 9/1999 | Beckert et al. | 340/815.41 |
| 6,081,420 A * | 6/2000 | Kim et al. | 361/681 |
| D438,853 S | 3/2001 | Iino | D14/136 |
| 6,266,236 B1 * | 7/2001 | Ku et al. | 361/681 |
| 6,292,236 B1 * | 9/2001 | Rosen | 348/837 |
| 6,409,242 B1 * | 6/2002 | Chang | 296/37.7 |
| 6,669,285 B1 | 12/2003 | Park et al. | 297/217.3 |
| 6,719,343 B1 * | 4/2004 | Emerling et al. | 296/24.34 |
| 6,871,356 B1 | 3/2005 | Chang | 725/75 |
| 2003/0137584 A1 | 7/2003 | Norvell et al. | 348/61 |
| 2003/0184137 A1* | 10/2003 | Jost | 297/219.1 |

FOREIGN PATENT DOCUMENTS

| | | |
|---|---|---|
| FR | 2 829 980 | 3/2003 |
| JP | 2001-047921 | 2/2001 |
| WO | WO 02/074577 A1 | 9/2002 |
| WO | WO 03/029050 A1 | 4/2003 |

* cited by examiner

*Primary Examiner*—Yean-Hsi Chang
(74) *Attorney, Agent, or Firm*—F. Chau & Associates LLC (57) ABSTRACT

A video display system comprises a base portion, a first hinge coupled to the base portion, and an arm including a first end coupled to the first hinge, wherein the arm is movable about the first hinge. The video display system further comprises a second hinge coupled to a second end of the arm, and a display panel coupled to the second hinge, wherein the display is movable about the second hinge, the display panel comprising a display.

17 Claims, 14 Drawing Sheets

VIDEO DISPLAY SYSTEM

CROSS-REFERENCE TO RELATED APPLICATION

This application is a Continuation-In-Part of U.S. application Ser. No. 10/438,724, filed on May 15, 2003.

BACKGROUND OF THE INVENTION

1. Field of the Invention

The present invention relates to a video system, and more particularly to a video system having a display supported by an arm.

2. Discussion of Related Art

Figure 1:
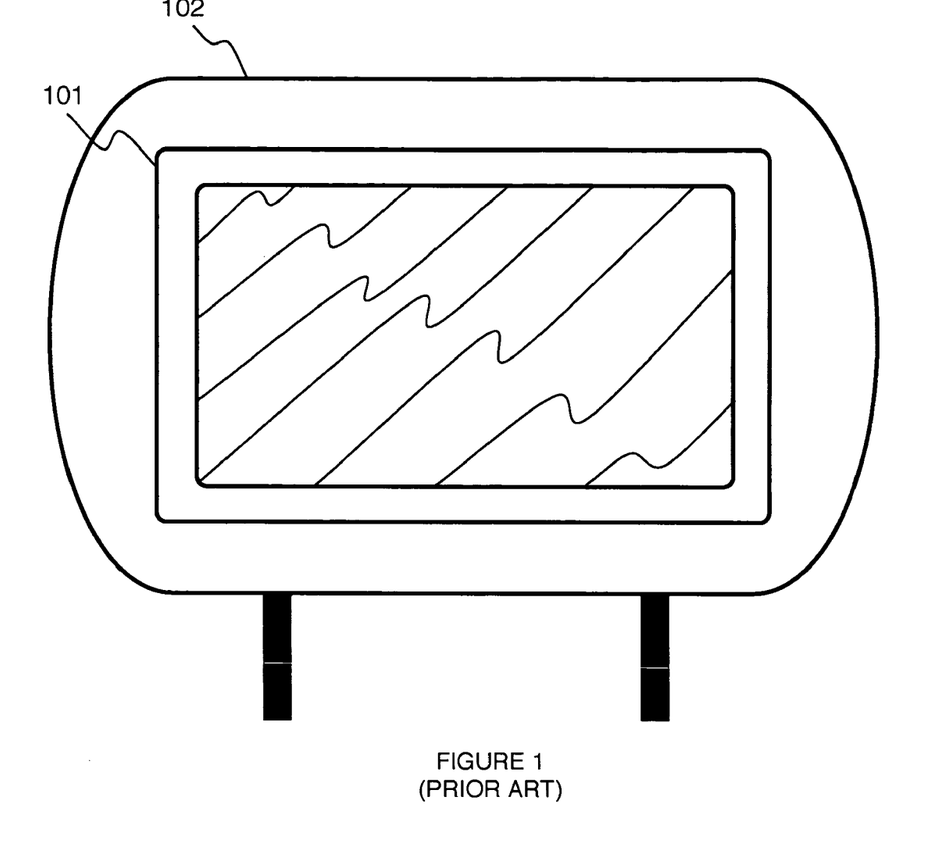
FIG. 1 is an illustration of a video screen installed in a vehicle headrest.
Figure 2:
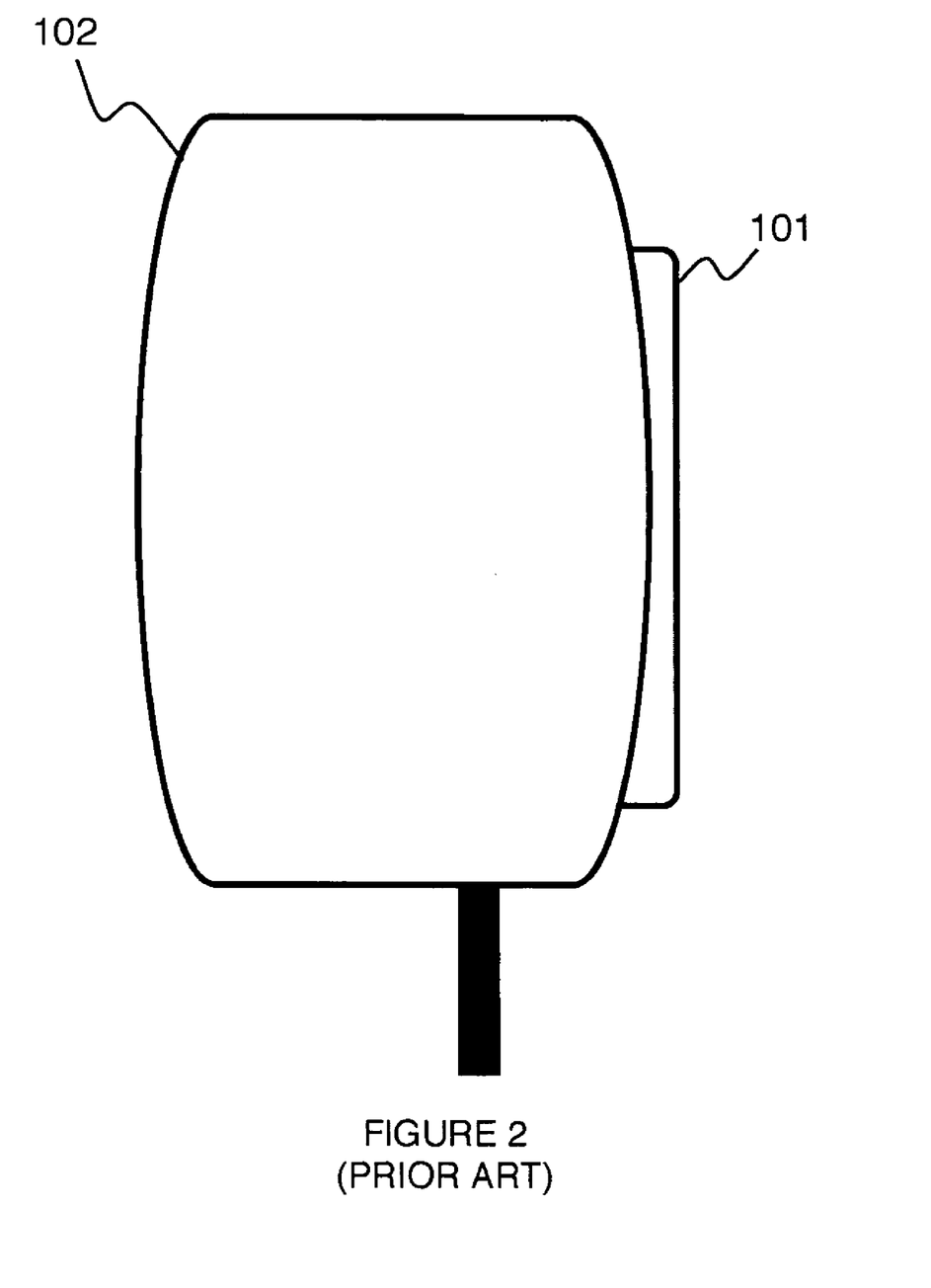
FIG. 2 is an illustration of a video screen installed in a vehicle headrest.

As society becomes more mobile and therefore spends a greater amount of time traveling and away from home, demand rises for electronic appliances and devices outside the home environment. For example, as shown in FIGS. 1 and 2, video screens 101 have been mounted in the headrests 102 of vehicles, facilitating video entertainment on the road. These video screens are connected to video players located, for example, in the glove box of the vehicle. However, the video player and video screen cannot be removed from the vehicle. Thus, videos may only be viewed with such systems when occupying the vehicle, and only from particular vantage points within the vehicle. Further, there is also a risk of theft of the video screen and video player and corresponding damage to the vehicle when the vehicle is unattended.

Therefore, a need exists for a portable video system.

SUMMARY OF THE INVENTION

According to an embodiment of the present invention, a video display system comprises a base portion, a first hinge coupled to the base. portion, and an arm including a first end coupled to the first hinge, wherein the arm is movable about the first hinge. The video display system further comprises a second hinge coupled to a second end of the arm, and a display panel coupled to the second hinge, wherein the display is movable about the second hinge, the display panel comprising a display.

The display panel is latchable to the base portion, preventing movement of the display and arm. The display faces towards the base portion in a latched position. The display faces away from the base portion in a latched position.

The video display system comprises a docking station for securing the base portion. The docking station comprises a control for releasing the display from a latched position. The docking station comprises a control for releasing the base portion from the docking station. The docking station further comprises a door hinged along a side of the docking station for selectively concealing the video display system.

The video display system comprises a bracket for securing the base portion to a surface, the bracket comprising a hinge coupled to a first point of the base portion and a latch for selectively securing a second point of the base portion.

The video display system further comprises a media player for receiving a media comprising data to be displayed by the display.

The first hinge is positioned along an edge of the base portion and the second hinge is positioned at a point between two opposing edges of the display panel.

According to an embodiment of the present invention, a video display system comprises a base portion comprising a media player, a display panel comprising a display, wherein the display panel is simultaneously moveable on an arc about a first point of the base portion and a plurality of second points defined along the arc, wherein the arc is on a plane perpendicular to the base portion, and a docking station for securing the base portion.

The docking station secures the base portion to a vehicle headrest. The docking station comprises a door for concealing the video display system.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, a portable video system can be coupled to a vehicle headrest. The portable video system receives a data media comprising data to be displayed. The video system is secured to a docking station. The docking station can be mounted, for example, in a headrest of an automobile's seat or under a kitchen cabinet. The video system is removable, such that the video system can be disconnected from the docking station.

Figure 3A:
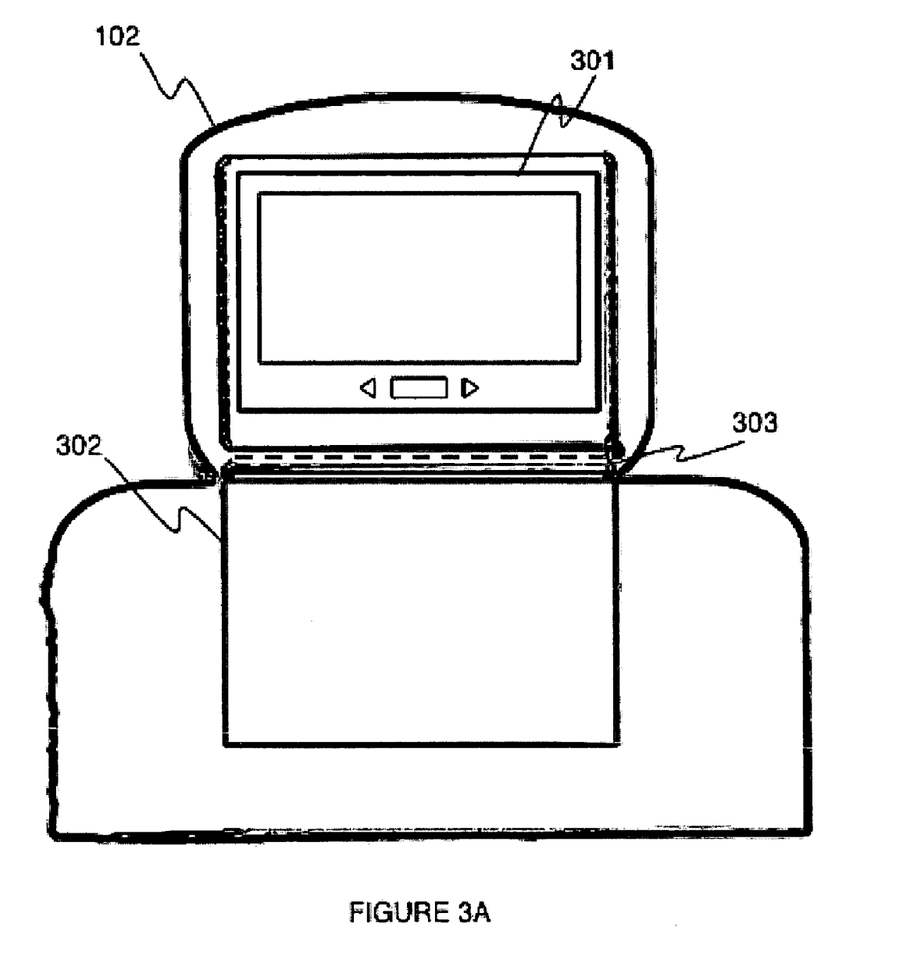
FIG. 3A is an illustration of a video system according to an embodiment of the present invention.
Figure 3B:
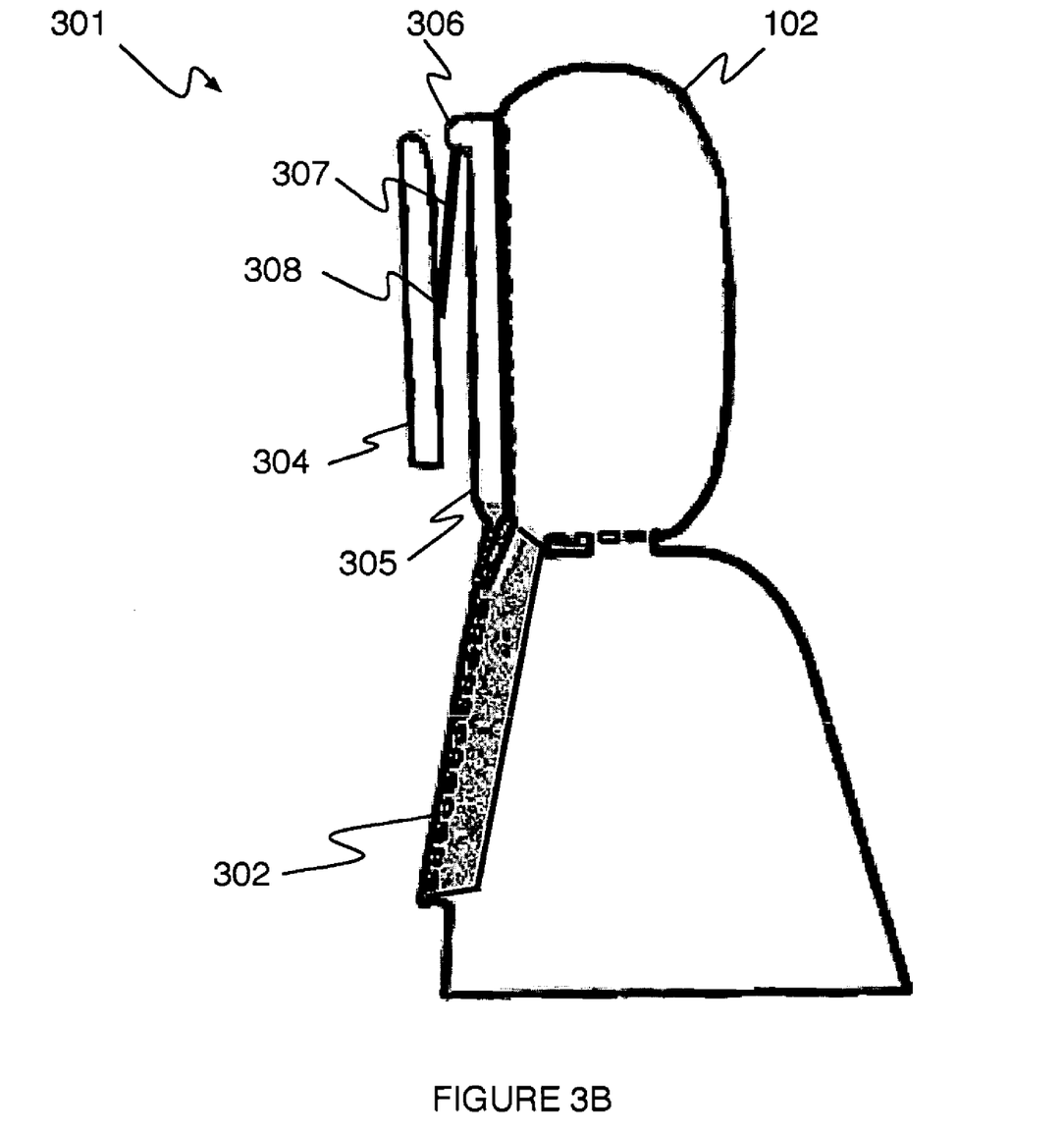
FIG. 3B is an illustration of a side view of a video system according to an embodiment of the present invention.
Figure 3C:
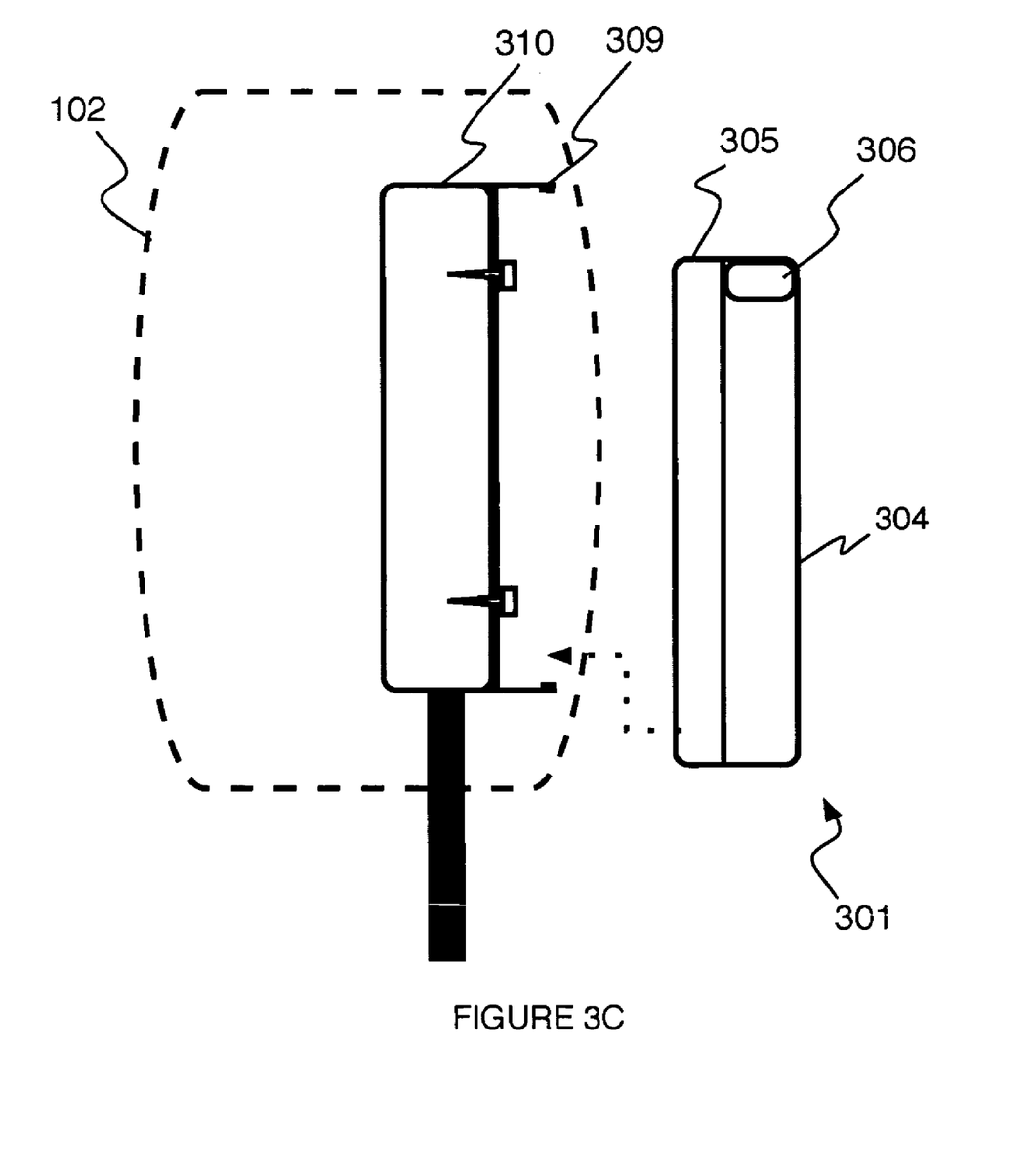
FIG. 3C is an illustration of a side view of a docking station and an undocked stationed video system according to an embodiment of the present invention.

Referring to FIGS. 3A–3C, a video system 301 is mounted in a headrest 102. A door 302 can protect the video system 301. The door 302 swings away from the headrest 102 to reveal the video system 301. The door 302 is coupled to the docking station by a hinge or other retaining means. When the video system 301 is removed from the headrest 102, the door 302 can be closed to conceal the docking station.

Referring to FIG. 3B, the video system 301 comprises a video display panel 304. The video display panel 304 is coupled to a video system base portion 305 by a hinge. More than one hinge can be provided.

A first hinge 306 is provided to movably couple the video system base portion 305 to an arm 307. The arm 307 is in turn movably coupled to the video display panel 304 by a second hinge 308. The first hinge 306 is positioned along an edge of the base portion 305. The second hinge 308 is connected to the display panel 304 a point between two opposing edges of the display panel, such that the display panel 304 can be positioned against the base portion 305 facing towards the base portion or away from the base portion 305. The first hinge 306 and second hinge 308 operate in a plane perpendicular to the video system base portion 305 allowing the display panel 304 to move in an arc around the first hinge 306. Thus, the display panel 304 is simultaneously moveable on an arc about a first point of the base portion and a plurality of second points defined along the arc, wherein the arc is on a plane perpendicular to the base portion A hinge may provide movement in more than one axis. For example, the second hinge 308 may allow movement in the plane perpendicular to the video system base portion 305 and in a left/right pan movement. According to another example, a hinge may be a ball and socket type hinge allowing the display panel 304 to be positioned in any of a plurality of planes.

Figure 4A:
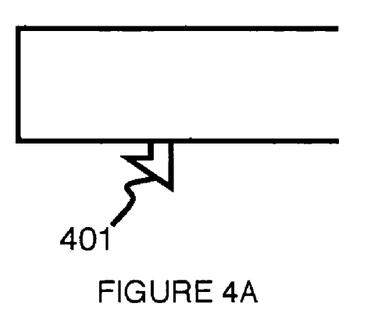
FIGS. 4A and 4B are illustrations of a docking station according to an embodiment of the present invention.
Figure 4B:
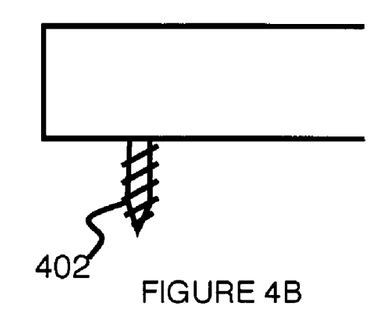

Referring to FIG. 3C, the video system 301 can be permanently mounted or coupled to a docking station 309 of the headrest 102. The docking station 309 is secured in the headrest 102, and more particularly to an internal headrest support structure 310. The docking station 309 can be secured by, for example, a catch 401 as shown in FIG. 4A and/or a screw 402 as shown in FIG. 4B. One of ordinary skill in the art would recognize that other means of securing the docking station can be used, for example, an adhesive compound. The docking station 309 secures a base portion 305 of the video system 301, and allows a video screen portion 304 to move away from the base portion 305.

As shown in FIG. 3C, the video system 301 can be disconnected from the docking station 309 (cut away view). The video system 301 can be operated autonomously. That is, when decoupled from the docking station 309, the video system 301 can access a data media to play, for example, a movie. When disconnected from the docking station 309, the video system 301 can operate on power supplied by an optional battery or a connection to an external power supply, such as an AC or DC current. The connection can be to the base portion 305 of the video system 301.

Referring to FIGS. 5A–5D, a video system 301 and docking station 501 are shown. The video system 301 is removable, such that the video system can be disconnected from the docking station 501. The video system 301 comprises a base portion 305 and a display panel 304.

A base portion of the video system 305 comprises a control panel 502. The control panel 502 comprises a plurality of controls for controlling the functions of the media player, for example, volume control, previous, next, pause, eject and play, and a power on/off button. The controls can be, for example, buttons, switches, a touch sensitive liquid crystal display, and the like. The base portion comprises a door 503 concealing a media player, e.g., a DVD or CD-ROM player.

The docking station 501 comprises a control 504 for releasing the video system 301 and a control 505 for releasing the display panel 304 independent of the base portion 305, such that the display panel 304 may be opened while the video system 301 is docked. The control 505 for releasing the display panel 304 operates a latch or other retaining means that retains the display panel 304 to the base portion 305. The docking station 501 may also comprise additional elements such as courtesy lights 506, audio/visual ports, remote control signal receivers, etc.

Figure 5A:
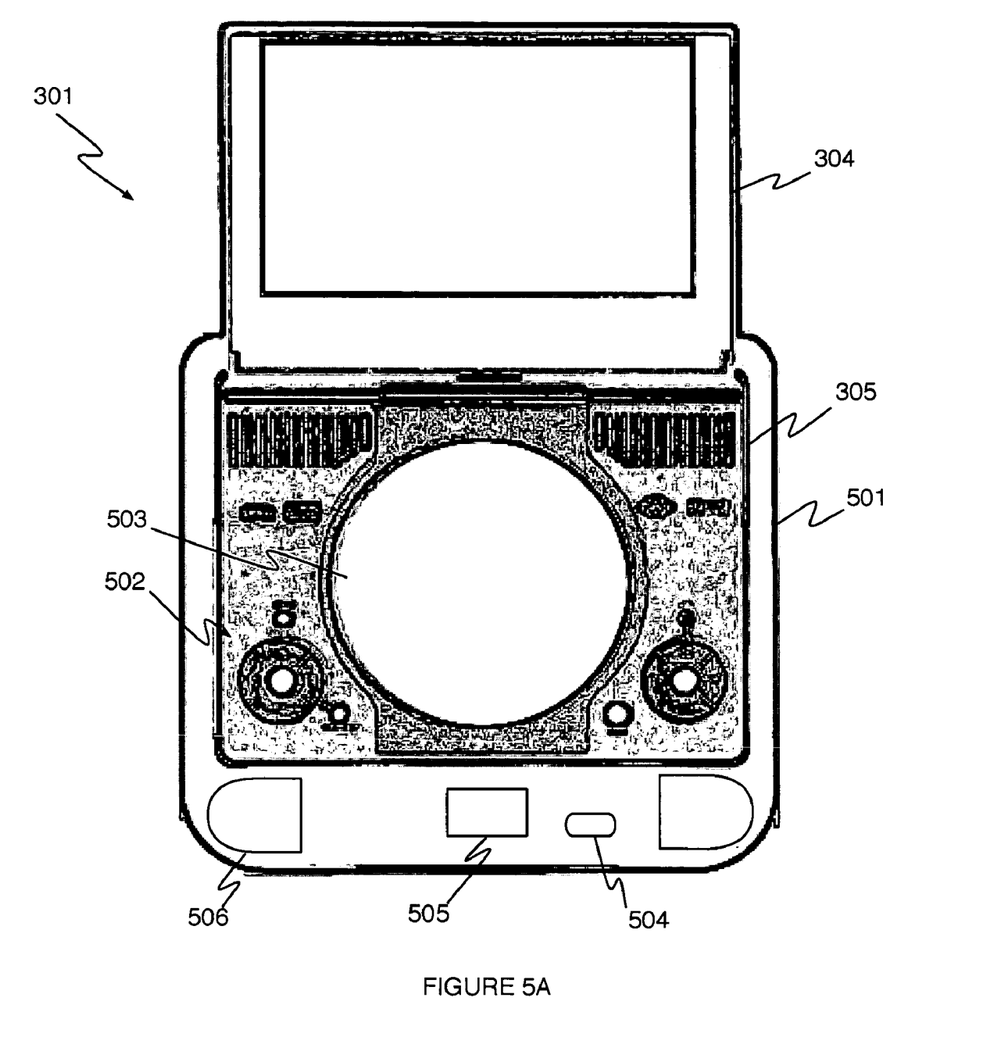
FIG. 5A is an illustration of a front view of a video system and docking station according to an embodiment of the present invention.
Figure 5B:
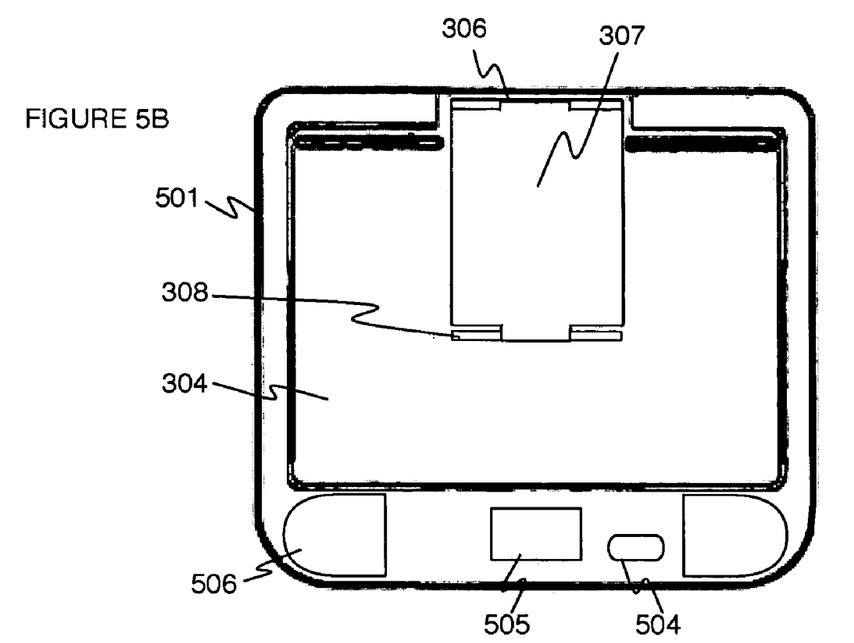
FIG. 5B is an illustration of a top view of a video system and docking station according to an embodiment of the present invention.
Figure 5C:
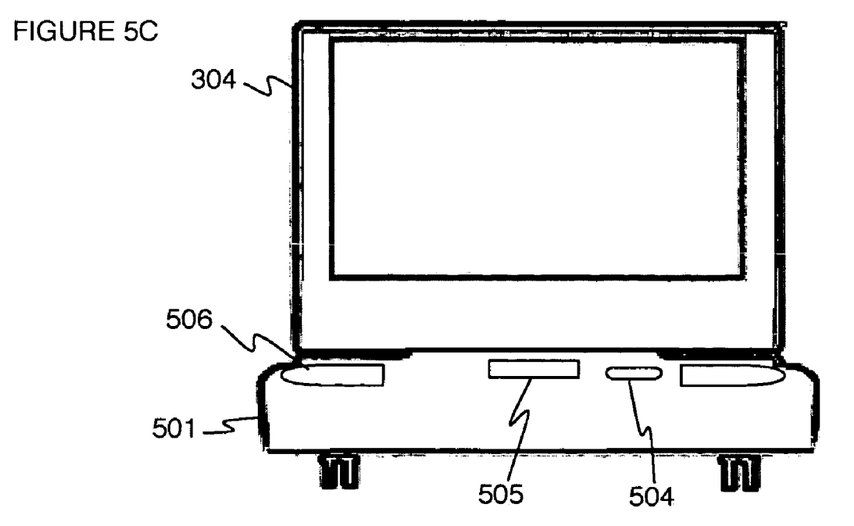
FIG. 5C is an illustration of a video system and docking station according to an embodiment of the present invention.
Figure 5D:
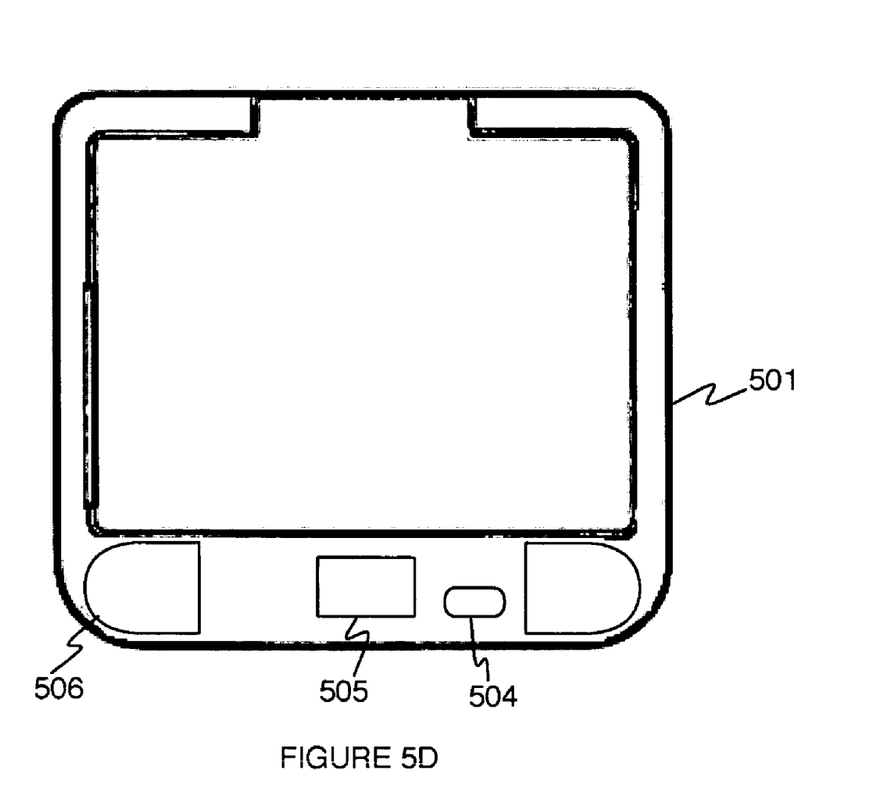
FIG. 5D is an illustration of a top view of a docking station according to an embodiment of the present invention.
Figure 5E:
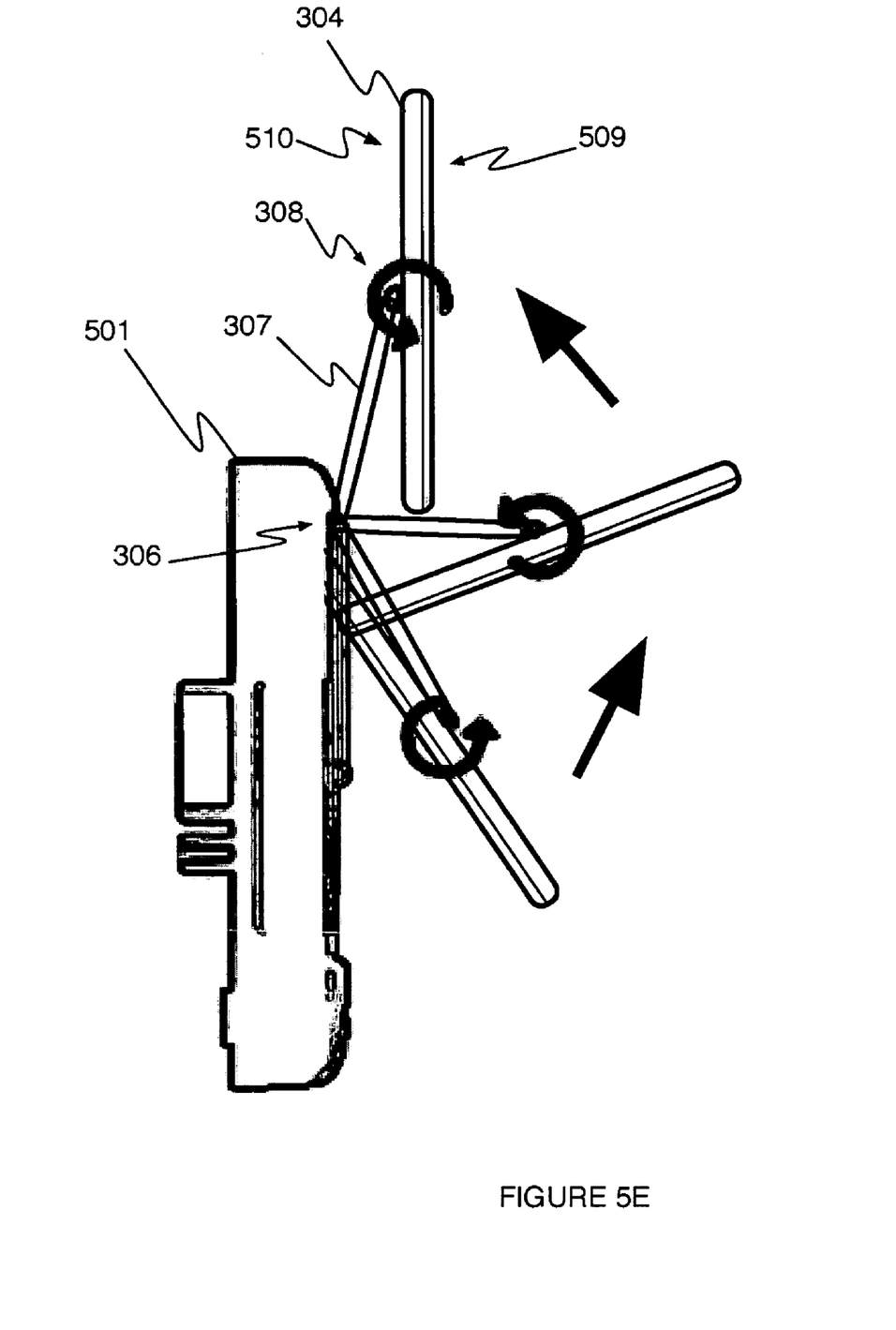
FIG. 5E is an illustration of a side view of a video system according to an embodiment of the present invention.

Referring to FIGS. 5B and 5E, the first hinge 306 and second hinge 308 are connected to the arm 307. The arm 307, in combination with the first hinge 306 and second hinge 308, couple the display panel 304 to a base portion of the video system docked in the docking station 501. The display panel 304 comprises a display 509 for rendering data. When the display panel 304 is closed, e.g., latched to the base portion, the display 509 may be visible or may be protected by a back portion 510 of the display panel 304. As shown in FIGS. 3A–3B and 5E, the display panel 304 can be latched to the base portion with the display facing towards the base portion for storage or away from the base portion for viewing.

Figure 6A:
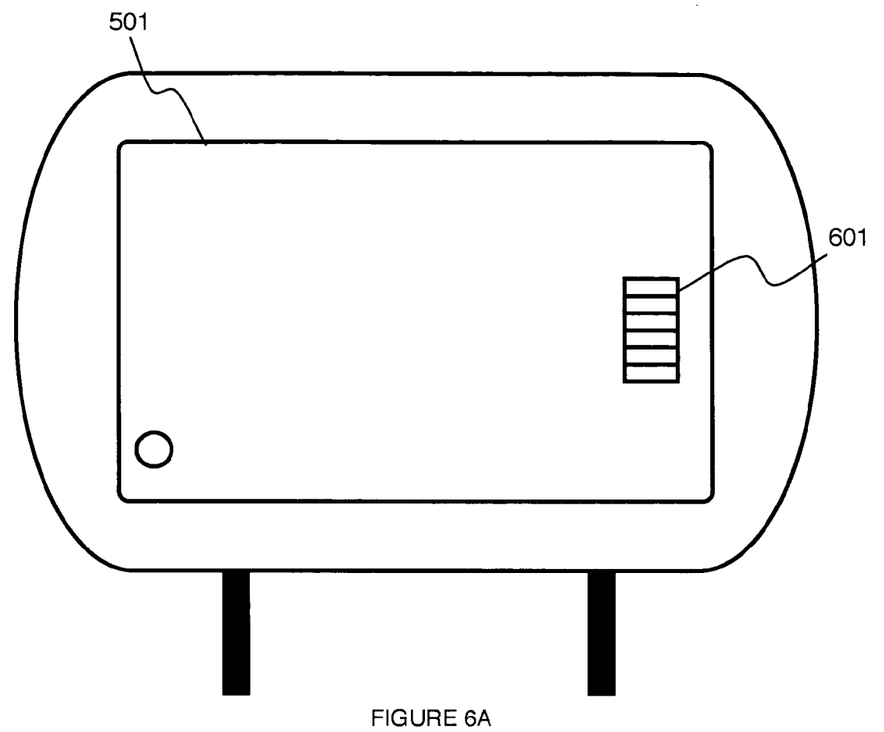
FIG. 6A is an illustration of a docking station according to an embodiment of the present invention.
Figure 6B:
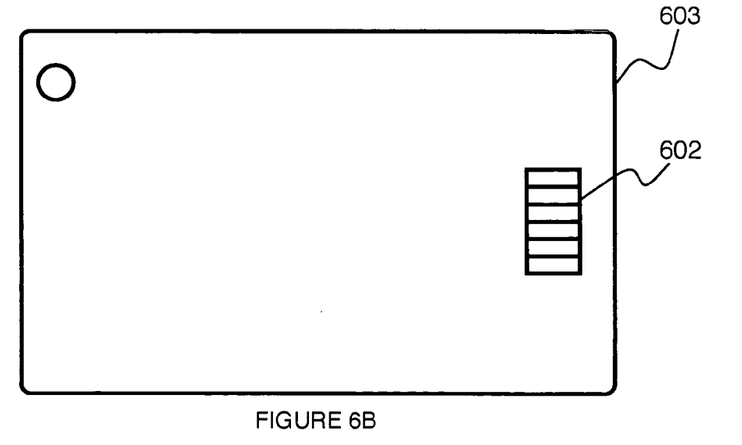
FIG. 6B is an illustration of a rear view of a video system according to an embodiment of the present invention.

Referring to FIGS. 6A–6B, a docking station 501 is coupled to a vehicle's electrical system. The docking station 501 is connected to a vehicle's power supply, e.g., 12 Volts, through a wiring harness. Power can be supplied to the video system 603 through the pin arrays 601 and 602. The docking station 501 can be connected to a vehicle's data communication bus. The data communications bus can carry data to and from the external devices.

Figure 7A:
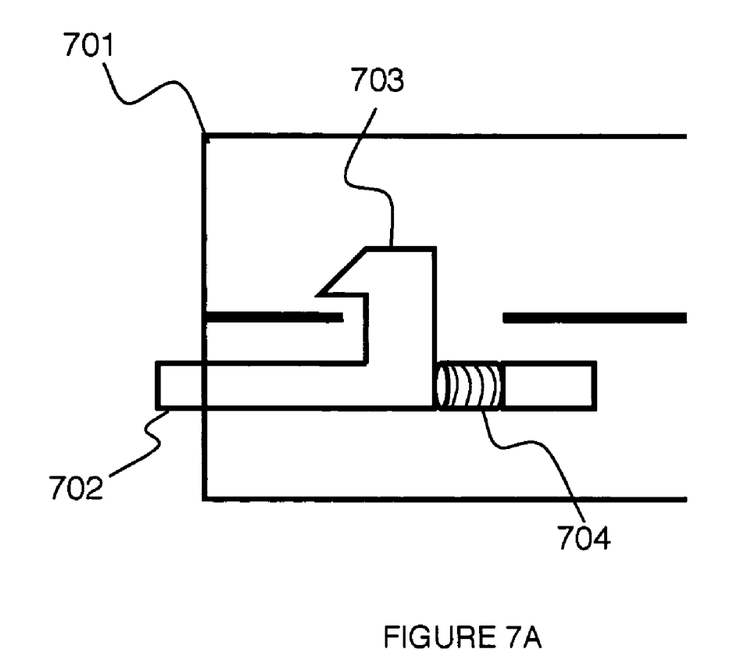
FIGS. 7A and 7B are illustrations of mechanisms for coupling a video system and a docking station according to an embodiment of the present invention.
Figure 7B:
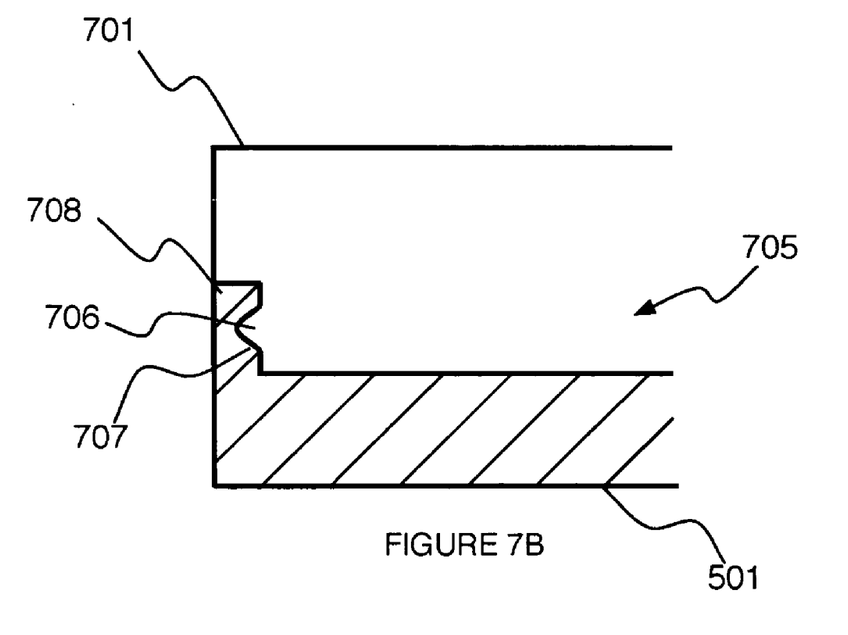

Referring to FIG. 7A, the docking station 501 comprises a quick release mechanism for securing and releasing the video system 701. The quick release mechanism can include a button 702 for releasing a latch 703, which is secured to the video system 701 by pressing the video system 701 securely into the docking station 501. A latch mechanism comprises a latch 703 that passes into a bottom portion of the video system 701. The latch 703 is momentarily displaced as the video system 701 is coupled with the docking station 501. A spring 704 secures the latch 703 in the bottom portion of the video system 701. The button 702 can be pressed, aligning the latch 703 with an opening in the bottom portion of the video system 701, and the video system 701 can be pulled away from the docking station 501. As shown in FIG. 7B, a rear portion 705 of the video system 701 can be secured by a convex portion 706 that fits within a concave portion 707 in the docking station 501. As the video system 701 is pressed into the docking station 501, a wall of the docking station 708 flexes away from the rear portion of the video player until the convex portion 706 is aligned with the concave portion 707. The convex portion 706 and the concave portion 707 cooperate to secure the video system 701 to the docking station 501. Thus, a wall of the docking station 708 can be formed of, for example, a flexible thermoplastic rubber. Other means of securing the video system 701 to the docking station 501 are contemplated, such as, snaps, locks, latches, and the like.

It is to be appreciated that a portable video system according to the present invention is easily removable from and can be operated outside of a vehicle, for example, in home or office environments. Further, the video system can be permanently connected to the headrest support structure by, for example, screws, catches, and adhesives.

Figure 8A:
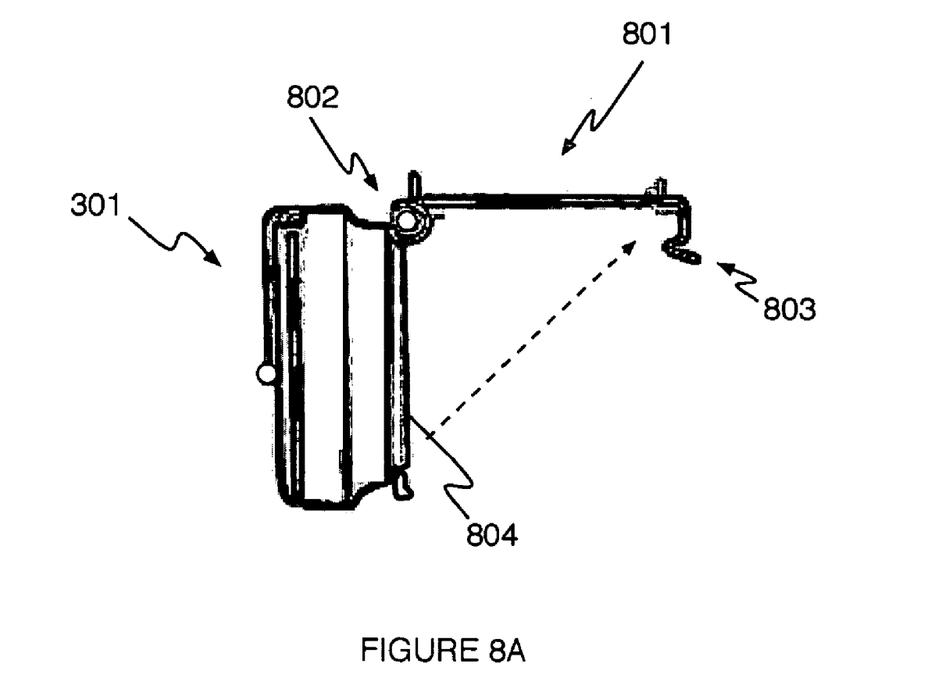
FIG. 8A is an illustration of a side view of a video system and mounting bracket according to an embodiment of the present invention.
Figure 8B:
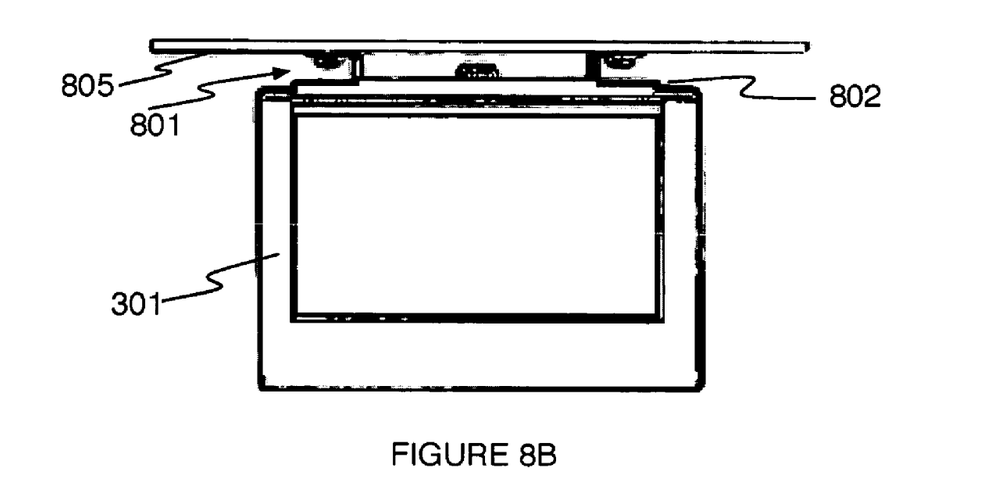
FIG. 8B is an illustration of a front view of a video system and mounting bracket according to an embodiment of the present invention.

Referring to FIGS. 8A and 8B, a video system 301 may be installed on a surface, such as under a shelf or on a desk. The video system 301, including the display and base portion, can be coupled to a bracket 801. The bracket 801 comprises a base portion including a hinge 802 and a latch 803, and an arm portion 804 coupled to the hinge 802 and able to swing away from the surface 805 when disconnected from the latch 803. Coupled to the arm portion 804, the video system 301 can swing away from the surface 805. The video system 301 may be coupled to the bracket by a docking station 501, facilitating the removal of the video system 301. Where a docking station 501 is implemented, the docking station is coupled to the portion of the bracket that is movable away from the surface 805.

Figure 9:
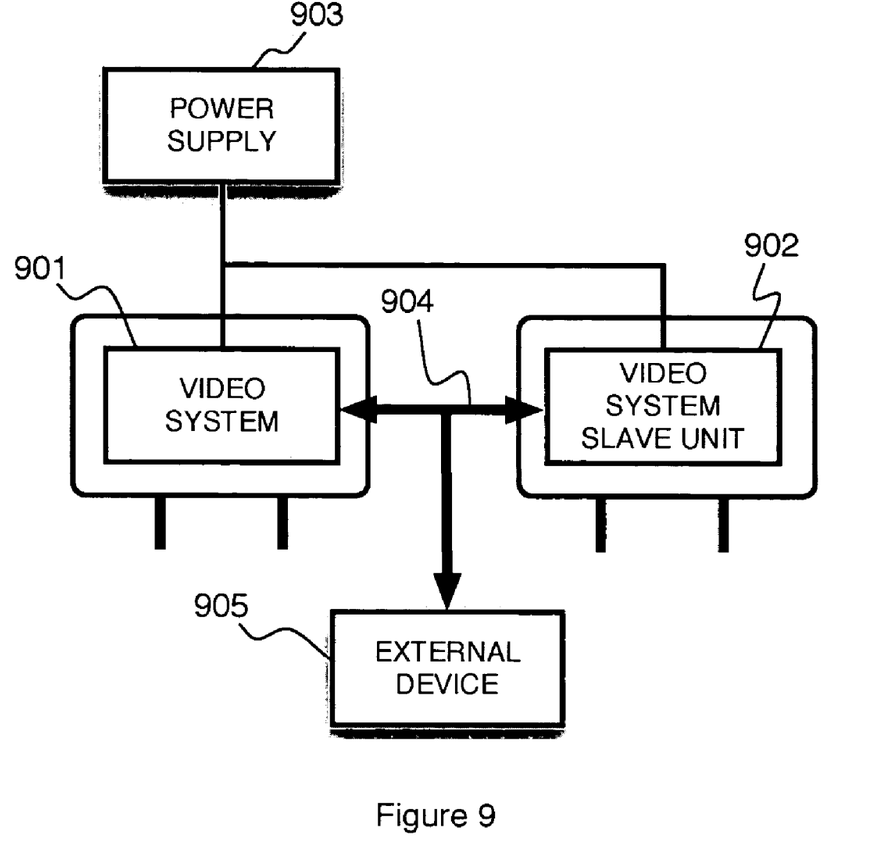
FIG. 9 is a diagram of a system according to an embodiment of the present invention.

Referring now to FIG. 9, a video system 901 and a video slave unit 902 are connected to a power supply 903. The video slave unit receives data to be displayed from the video system 901 through a data bus 904. The data bus 904 can be connected to other devices 905, such as a vehicle's sound system or a vehicle's navigation system. The connections between the video system 901 and the external device 905 can be a wireless connection (not shown). Similarly, the connection between the video system 901 and the video system slave device 902 can be a wireless connection (not shown).

Having described embodiments for headrest mountable a video system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A video display system mounted in a headrest in a vehicle, comprising:
    a media player;
    a base portion positioned substantially within the headrest;
    a first hinge coupled to the base portion;
    an arm including a first end coupled to the first hinge, wherein the arm is movable about the first hinge;
    a second hinge coupled to a second end of the arm; and
    a display panel coupled to the second hinge, the display panel comprising a display, wherein:
        the display panel is movable about the second hinge;
        the base portion includes the media player; and
        the media player receives a media comprising data to be displayed by the display.

2. The video display system of claim 1, wherein the display panel is latchable to the base portion, preventing movement of the display and arm.

3. The video display system of claim 1, wherein the display faces towards the base portion in a latched position.

4. The video display system of claim 1, wherein the display faces away from the base portion in a latched position.

5. The video display system of claim 1, further comprising a docking station for securing the base portion.

6. The video display system of claim 5, wherein the docking station comprises a control for releasing the display from a latched position.

7. The video display system of claim 5, wherein the docking station comprises a control for releasing the base portion from the docking station.

8. The video display system of claim 5, wherein the docking station further comprises a door hinged along a side of the docking station for selectively concealing the video display system.

9. The video display system of claim 1, wherein the first hinge is positioned along an edge of the base portion and the second hinge is positioned at a point between two opposing edges of the display panel.

10. The video display system of claim 1, wherein the base portion is mounted to an internal portion of the headrest.

11. The video display system of claim 1, wherein the arm sits flat on a back side of the display panel when the display panel is in a stowed configuration.

12. The video display system of claim 1, wherein the second hinge is a ball and socket type hinge.

13. The video display system of claim 1, wherein the display panel conceals a media loading point of the media player when the display panel is in a stowed configuration.

14. A video display system comprising:
    a base portion comprising a media player;
    a display panel comprising a display, wherein the display panel is simultaneously moveable on an arc about a first point of the base portion and a plurality of second points defined along the arc, wherein the arc is on a plane perpendicular to the base portion; and
    a docking station for securing the base portion substantially within a vehicle head rest.

15. The video display system of claim 14, wherein the docking station comprises a door for concealing the video display system.

16. The video display system of claim 14, wherein the docking station is mounted to an internal portion of the headrest.

17. A video display system mounted in a headrest in a vehicle, comprising:
    a media player;
    a base portion positioned substantially within the headrest;
    a first hinge coupled to the base portion;
    an arm including a first end coupled to the first hinge, wherein the arm is movable about the first hinge;
    a second hinge coupled to a second end of the arm, wherein the second hinge is a ball and socket type hinge; and
    a display panel coupled to the second hinge, wherein the display panel is movable about the second hinge, the display panel comprising a display.

* * * * *